(12) United States Patent
Jessen

(10) Patent No.: US 7,212,888 B2
(45) Date of Patent: May 1, 2007

(54) METHOD FOR CONTROLLING THE DRIVE UNIT OF A VEHICLE

(75) Inventor: Holger Jessen, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/621,512

(22) Filed: Jul. 18, 2003

(65) Prior Publication Data
US 2004/0014561 A1    Jan. 22, 2004

(30) Foreign Application Priority Data
Jul. 19, 2002    (DE) ................................. 102 32 875

(51) Int. Cl.
G05D 1/00    (2006.01)
G05D 3/00    (2006.01)

(52) U.S. Cl. .............................. 701/1; 701/36; 701/53; 477/97

(58) Field of Classification Search ..................... 701/1, 701/36, 51–53; 477/97
See application file for complete search history.

(56) References Cited

U.S. PATENT DOCUMENTS

| | | | | |
|---|---|---|---|---|
| 4,147,035 A * | 4/1979 | Moore et al. .................. 60/711 |
| 4,625,281 A * | 11/1986 | Deutsch ....................... 701/101 |
| 4,763,282 A * | 8/1988 | Rosenberg ................... 600/310 |
| 5,097,724 A * | 3/1992 | Braun .......................... 477/73 |
| 5,991,669 A | 11/1999 | Dominke et al. |
| 6,092,006 A * | 7/2000 | Dominke et al. ............... 701/1 |
| 6,285,946 B1 * | 9/2001 | Steinmann ................... 701/110 |
| 6,295,494 B1 * | 9/2001 | Nitschke et al. ............... 701/45 |
| 6,368,248 B1 * | 4/2002 | Bauer et al. .................. 477/111 |
| 6,394,063 B1 * | 5/2002 | Volz et al. ................... 123/295 |
| 6,467,451 B1 * | 10/2002 | Volz et al. ................... 123/295 |
| 6,539,915 B1 * | 4/2003 | Wild et al. ................... 123/295 |
| 6,778,883 B1 * | 8/2004 | Gerhardt et al. ............... 701/1 |
| 6,842,686 B2 * | 1/2005 | Nicolaou et al. ............. 701/84 |
| 2003/0100405 A1 * | 5/2003 | Homeyer et al. ........... 477/174 |
| 2004/0098190 A1 * | 5/2004 | Nakayama et al. ......... 701/104 |

FOREIGN PATENT DOCUMENTS

DE    197 39 567    3/1999
DE    100 16 649    6/2001

OTHER PUBLICATIONS

"SAE International Surface Vehicle Recommended Practice", SAE J1939-71, issued Aug. 1994, revised Aug. 2002, pp. 1 to 280.

* cited by examiner

Primary Examiner—Gertrude A. Jeanglaude
(74) Attorney, Agent, or Firm—Walter Ottesen

(57) ABSTRACT

A method for controlling the drive unit of a vehicle considers several desired input quantities of different priority in the formation of a desired value. At least one output quantity of the drive unit is adjusted in dependence upon the desired value input quantities. For adjustment, a desired value is formed which considers the desired value input quantities in the sequence of their priority.

20 Claims, 3 Drawing Sheets

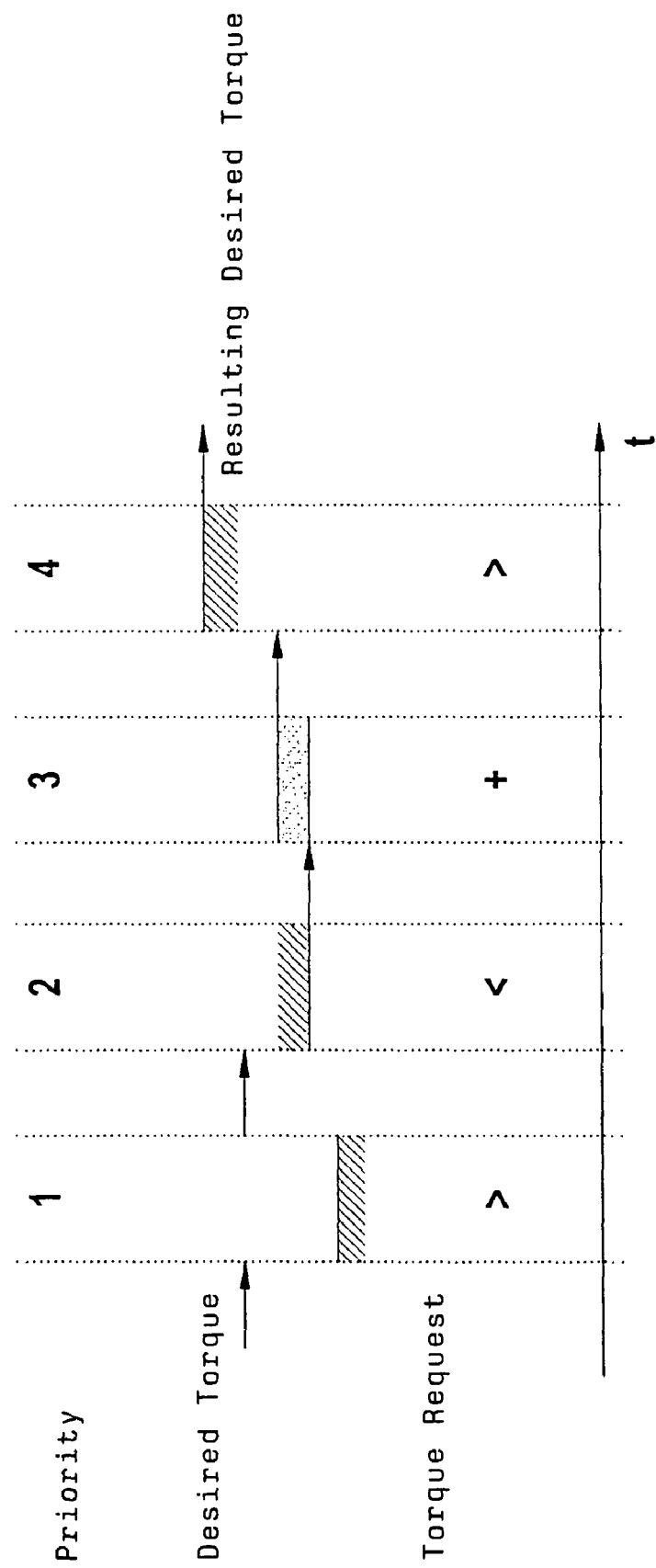

METHOD FOR CONTROLLING THE DRIVE UNIT OF A VEHICLE

BACKGROUND OF THE INVENTION

U.S. Pat. No. 6,778,883 discloses a method for controlling the drive unit of a vehicle. At least one output quantity of the drive unit is adjusted in dependence upon desired value input quantities. To make an adjustment, one of the desired value input quantities is applied which is selected from the received desired value input quantities. In addition to the desired value input quantities, characteristic quantities are received which describe the type of adjustment of the desired value input quantities. To control the drive unit, these characteristic quantities are selected independently of the desired value inputs. The characteristic quantities include dynamic requests and priorities.

A method and an arrangement for controlling the torque of the drive unit of a vehicle are known from German patent publication 197 39 567. In this method and arrangement, a desired torque value for adjusting the charge is formed from several desired values and at least one desired torque value for adjusting power parameters of an internal combustion engine, which effect a rapid torque change, is formed from several desired values. The two desired torque values are different and the formation of these desired torque values is based on at least one different and/or corrected desired value.

U.S. Pat. No. 5,991,669 discloses a method wherein coordinators are pregiven for a vehicle and these coordinators undertake the resource requirement and the resource distribution of the control systems of the vehicle, inter alia, on the basis of received peripheral conditions such as a desired dynamic or priority.

In engine controls for commercial vehicles, requirements of external control apparatus with respect to engine torque or the desired rpm must be considered in various applications. The different applications having a variable type and number of requests should be mastered with an engine control software so that the engine control, without changes, can coordinate and realize all requests of the external control apparatus together. For this purpose, standard formats for torque desired values and rpm desired values are defined in SAE J 1939-71 and standard limits as well as priorities are defined in four ratings for their coordination. A selection logic is given for the evaluation of the requests while considering the priority. The present requests are sequentially reduced by comparison to a resulting request. In each comparison, that desired value is selected having the greater priority. With like priorities, the more actual desired value is selected. The lower limit is selected for limitations of equal priority.

SUMMARY OF THE INVENTION

The method of the invention affords the advantage compared to the above that a desired value is formed for adjusting the at least one output quantity of the drive unit in dependence upon desired value input quantities. This desired value considers the desired value input quantities in the sequence of their priority. In this way, all desired value input quantities flow into the formation of the desired value. In this way, the method of the invention is flexible and robust compared to expansions and changes with respect to the type and number of requests or of desired value input quantities.

The method of the invention is for controlling a drive unit of a vehicle and includes the steps of: adjusting an output quantity of the drive unit in dependence upon desired value input quantities; and, to make the adjustment of the output quantity, forming a desired value which considers the desired value input quantities in a sequence of their priorities.

It is especially advantageous when the desired value input quantities are considered in the formation of the desired value starting from the desired value input quantity having the lowest priority. In this way, it is ensured that the desired value input quantity having the highest priority is realized last and therefore completely.

A further advantage of the invention is that the desired value input quantities are each coupled with a different priority and, stated otherwise, identical priorities for two or more desired value input quantities are precluded. In this way, there can be no conflict in the consideration of desired value input quantities for forming the desired value based on equal priorities. Rather, the desired value input quantities are considered in the formation of the desired value in a clear sequence.

Another advantage results when the desired value input quantities are each permanently assigned a priority. In this way, the priority of the particular desired value input quantity need not be determined and scanned or interrogated for each formation of the desired value so that the formation of the desired value requires only a minimum computation time.

However, it is also advantageous when the desired value input quantities are each variably assigned a priority. In this case, the sequence in the consideration of the desired value input quantities for forming the desired value can be changed and the method of the invention can be utilized with greater flexibility.

It is especially advantageous when the priorities are assigned in dependence upon the operating state of the vehicle. In this way, the sequence in the formation of the desired value input quantities for forming the desired value can be adapted to the operating state of the vehicle and, in this way, a sequence, which is optimal for the operating state of the vehicle, is realized in the consideration of the desired value input quantities for forming the desired value.

A further advantage is that different types of desired value input quantities are considered via different modules and same types of desired value input quantities are considered via a single module in each case for the formation of the desired value. In this way, the method of the invention can be built up in a modular way so that expansions and/or changes with respect to the type and number of desired value input quantities do not themselves act on the implementation of the individual modules; rather, the expansions and/or changes can be mastered exclusively via the type and frequency of the call-ups of already available modules.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
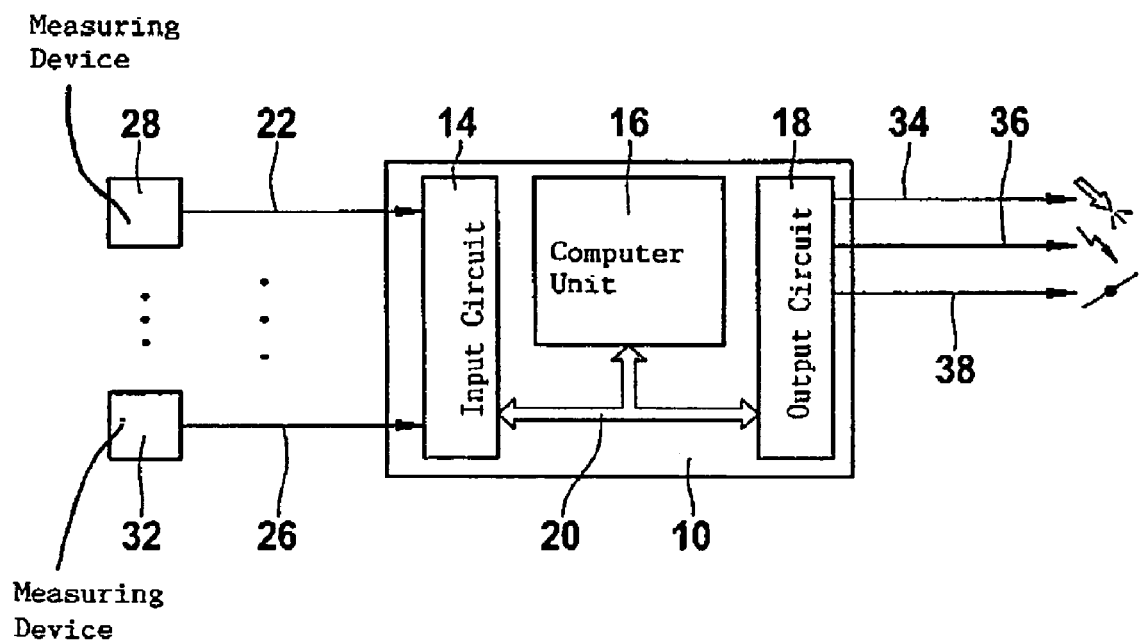
FIG. 1 is an overview block diagram of a control arrangement for controlling a drive unit according to a preferred embodiment of the invention.

FIG. 1 shows a block circuit diagram of a control arrangement for controlling a drive unit of a vehicle, especially of an internal combustion engine. A control unit 10 is provided which has components in the form of an input circuit 14, at least one computer unit 16 and an output circuit 18. A communications system 20 connects the components for the mutual exchange of data. Input lines 22 to 26 are connected to the input circuit 14 of the control unit 10 and these input lines are configured as a bus system in a preferred embodiment and signals are supplied via these input lines to the control unit 10. These signals represent operating variables which are to be evaluated for controlling the drive unit. These signals are detected by measuring devices 28 to 32. Operating variables of this kind include: accelerator pedal position, engine rpm, engine load, exhaust-gas composition, engine temperature, et cetera. The control unit 10 controls the power of the drive unit via the output circuit 18. This is symbolized in FIG. 1 with the output lines 34, 36 and 38 via which, in this embodiment, at least the fuel mass, which is to be injected, the ignition angle of the engine as well as at least one electrically-actuable throttle flap for the adjustment of the air supply to the engine are actuated. In this embodiment, it is assumed by way of example that the engine is operated by gasoline direct injection. In addition to the described input quantities, other control systems of the vehicle are provided which transmit desired value input quantities, for example, in the form of a torque to the input circuit 14. Control systems of this kind are, for example, drive slip controls, driving dynamic controls, transmission controls, engine drag torque controls, et cetera. The air supply of the engine, the ignition angle of the individual cylinders, the fuel mass to be injected, the injection time point, the air/fuel ratio, et cetera are all adjusted via the actuating paths shown. In addition to the illustrated desired value input quantities to which also a desired value input by the driver in the form of a driver command belongs, there are internal desired value input quantities for controlling the drive unit such as a torque change of an idle control, an rpm limiting which outputs a corresponding desired value input quantity, a speed change limiting and/or a torque change limiting, limitations for the purpose of protecting components or a separate desired value input quantity during start. The internal and the external desired value input quantities can, in part, show countering effects so that these desired value input quantities must be coordinated.

The coordination of the desired value input quantities leads finally to the formation of a desired value whose realization is achieved by adjusting at least one output quantity of the drive unit. Such an output quantity can, as described, be, for example, the air supply to the engine, the ignition angle of the individual cylinders, the fuel mass to be injected, the injection time point, the air/fuel ratio or the like. In the following, by way of example, it is assumed that the desired value, which is to be realized, is a desired value, for example, in the form of an engine output torque. The desired value input quantities are requests on the desired torque in this example and, stated otherwise, torque requests.

With the method of the invention, the coordination of torque requests in the control unit 10 should be realized in this example independently of the number, source and type of torque requests. The control unit 10 can be configured in this embodiment as an engine control. The source of the torque request could be the above-described external control systems such as, for example, drive slip control, drive dynamic control, transmission control, engine drag torque control, et cetera. A source of the torque requests can also be the engine control 10 itself. The requests can, for example, be in the form of a torque change of an idle control, an rpm limiting, which outputs a corresponding desired value input quantity for the desired torque, a speed change limiting and/or a torque change limiting, desired torque limiting to protect components or a separate desired torque input quantity during start of the vehicle.

The type of the torque requests can be the limiting of the desired torque with respect to maximum or minimum or the type of torque requests can be an additive contribution in positive or negative direction to the desired torque.

According to the invention, a priority is assigned to each torque request. The torque requests are considered in the sequence of their priorities in the formation of the desired torque. In this way, all torque requests can be considered in the formation of the desired torque. Each desired value input quantity, that is, here each torque request for the formation of the desired value (that is, here the desired torque) is realized. This means that the desired torque is compared to the limiting torque requests and, if needed, is limited. Furthermore, the desired torque is shifted by additive torque requests by an additive amount in a positive or negative direction. All torque requests are realized in this way in the formation of the desired torque.

In the formation of the desired torque, the torque requests are considered with increasing priority sequence in an advantageous manner starting from the torque request having the lowest priority. In this way, it is ensured that the torque request with the highest priority is also completely realized. In order to avoid conflicts in the realization of the torque requests for forming the desired torque, it can be provided that the torque requests are each coupled to a different priority so that identical priorities for two or more torque requests are precluded.

The method of the invention can, for example, be built up in modular fashion. Different types of torque requests can be considered by different modules and the same types of torque requests can be considered each by a single module for forming the desired torque. Accordingly, a single module can be provided for all torque requests which limit the desired torque downwardly. Likewise, a single module can be provided for all torque requests which limit the desired torque in the upward direction. Furthermore, a single module can be provided for all torque requests which displace the desired torque by an additive amount in a positive direction. Furthermore, a single module can be provided for all torque requests which displace the desired torque by an additive amount in a negative direction.

With the receipt of a torque request in the engine control 10 which requires a lower limiting of the desired torque, the corresponding module is called up by the engine control 10 and the lower limit is transferred as a parameter. The module then causes the comparison of the desired torque to be made with the lower limit and, when there is a drop below this lower limit by the desired torque, the module causes a limiting of the desired torque to the lower limit.

Correspondingly, with the receipt of a torque request which requires a limiting of the desired torque to an upper limit, the corresponding module is called up by the engine control 10 and the upper limit is transferred as a parameter. The called up module then compares the desired torque to the upper limit and limits the desired torque to the upper limit when the upper limit is exceeded.

Correspondingly, if a torque request is received which requires an additive amount in the positive direction to the desired torque, the assigned module is called up by the engine control and the additive amount is transferred as a parameter. The called up module then shifts the desired torque by the additive amount in the positive direction.

The same module can be called up by the engine control 10 also with a receipt of a torque request for an additive contribution in the negative direction to the desired torque when, in addition to the additive amount, also the sign is transferred as a parameter to this module so that the called up module shifts the desired torque by the additive amount in the negative direction. The modules can be realized in the form of a software structure and/or a hardware structure. Because of the described modular configuration of the method of the invention, an expansion by new torque requests or a change of the type of existing torque requests can be realized in a simple manner without a requirement that there be complex changes of the software or of the hardware of the engine control 10. A precondition here is that the new torque requests or the changed types of existing torque requests can be realized by available modules. The above-mentioned expansions and/or changes of the torque requests do not operate on the implementation of the modules but only on the frequency of the call-ups of the individually already existing modules and in the transferred respective parameters. In this way, the method of the invention is robust and flexible with respect to expansions and changes of the torque requests relative to the type and number thereof. It can be provided that such expansions and/or changes are undertaken during the running time of the method.

As described, a clear priority is assigned to the individual torque requests, respectively, in this example. The assignment of priorities to the individual torque requests can be permanently provided, for example, by the vehicle manufacturer. In this way, the sequence of the processing of the individual torque requests for forming the desired torque is fixed herein ab initio and, especially for a software realization of the method of the invention, a minimum computation time requirement is realized thereby. The individual modules are called up one after the other in a fixed pregiven sequence and are supplied with the corresponding parameter values of the individual torque requests.

It is, however, also possible to variably assign the corresponding priorities to the individual torque requests, for example, in dependence upon the operating state of the vehicle. In this way, the sequence for the call-up of the individual modules must first be fixed in advance of the realization of the torque requests in the formation of the desired torque. With suitable treatment of the data to be processed and especially the parameters to be transferred to the module by the torque requests and of the instantaneous desired torque with addresses as to the storage locations, the additional complexity as to running time and memory for the variable processing in priority of the torque requests can, however, be held low. Additional storage operations can be substantially prevented with the aid of such addressing technique.

The driving safety is increased because of the adaptation of the priority of the individual torque requests to the operating state of the vehicle. Accordingly, for example, in the case of an operating state having an active drive slip control, an upwardly limiting torque request of the drive slip control can be provided with the highest priority and prevent a break-away of the vehicle. If, in contrast, the drive slip control is not active, then a torque request of the drive slip control can be handled with lower priority. An allocation of different priorities to the individual torque requests received in the engine control 10 can take place via the engine control 10. For this purpose, the engine control 10 evaluates the instantaneous operating state of the engine. Here, for example, for each possible operating state of the vehicle, a different priority can be fixedly pregiven in a memory of the engine control 10 for the respective torque requests of the various sources. If, in the operating state of the source, a torque request is received in the engine control 10, then the engine control 10 assigns to the torque request the priority provided for this operating state. In the case of the operating state with active drive slip control, it can be, for example, provided that the engine control 10 provides the highest priority stage for the torque request of the drive slip control. As already described, to avoid conflicts for the torque requests, which are received in an operating state of the vehicle in the engine control 10, a different and therefore clear priority is allocated in each case.

Figure 2:
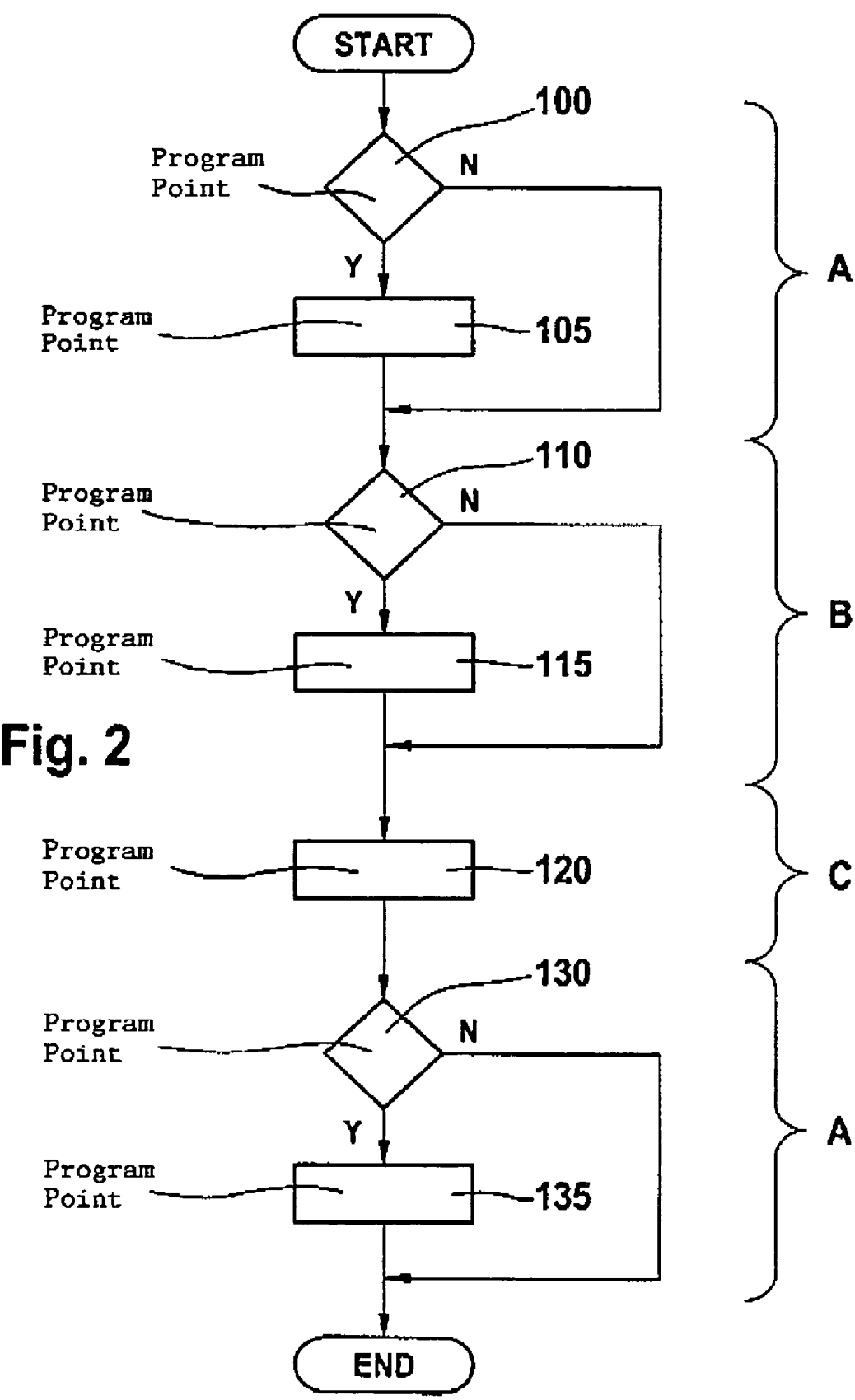
FIG. 2 is a flowchart for explaining the sequence of the method with respect to a selected example; and, FIG. 3 shows a time-dependent sequence for the consideration of individual desired value input quantities for forming a resulting desired value in accordance with the flowchart of FIG. 2.

In FIG. 2, an example for the sequence of the method of the invention is shown with reference to a flowchart. For the coordination of the torque requests, the desired torque is initialized at the start of the program with an uncoordinated value, as a rule, with a driver command torque. Thereafter, the program branches to program point 100. At program point 100, the engine control 10 processes the torque request having the lowest priority. This torque request is a first torque request to be limited downwardly. At program point 100, the engine control 10 compares the uncoordinated desired torque to the lower limit of the first torque request. At program point 100, the engine control checks whether the uncoordinated desired torque lies below the lower limit of the first torque request. If this is the case, then the program branches to a program point 105; otherwise, the program branches to a program point 110.

At program point 105, the engine control 10 triggers an increase of the desired torque to the lower limit in accordance with the first torque request having the lowest priority. Thereafter, the program branches to program point 110.

At program point 110, the engine control 10 processes the torque request having the next higher priority. In this example, this is a second torque request limiting upwardly. Accordingly, at program point 110, the engine control 10 checks whether the present desired torque exceeds the upper limit of this second torque request. If this is the case, then the program branches to program point 115; otherwise, the program branches to a program point 120.

At program point 115, the engine control 10 reduces the present desired torque to the upper limit of the second torque request. Thereafter, the program branches to program point 120.

At program point 120, the engine control 10 processes a third torque request with a higher priority compared to the second torque request. This third torque request is a torque request having an additive amount in the positive direction. In this way, the engine control 10 shifts the present desired torque at program point 120 by an additive amount of the third torque request in a positive direction in that the engine control adds the additive amount to the present desired torque. Thereafter, there is a branching to program point 130. At program point 130, the engine control 10 processes a fourth torque request with a priority increased compared to the third torque request and, in this example, with the highest priority. The fourth torque request is a torque request limiting downwardly. Accordingly, the engine control 10 checks at program point 130 whether the present desired torque lies below the lower limit of the fourth torque request. If this is the case, then the program branches to a program point 135; otherwise, there is a movement out of the program.

At program point 135, the engine control 10 raises the present desired torque to the lower limit of the fourth torque request. Thereafter, there is a movement out of the program.

In this example, four torque requests were run through starting from the torque request having the lowest priority and then with increasing priority sequence. Additional torque requests for this embodiment are not available. The program part from program point 100 up to but not including program point 110 corresponds to a first module A corresponding to a torque request limiting downwardly. In the same way, the program part from program point 130 to the program end corresponds to module A. The program part from program point 110 up to but not including program point 120 corresponds to a module B for realizing a torque request limiting upwardly. The program step 120 corresponds to a module C for realizing an additive contribution.

In the flowchart of FIG. 2, the module A is run through twice but with a different parameter for the lower limit of the particular torque request. The sequence of the call-up of the individual modules is dependent upon the priority of the individual torque requests. If the sequence of the priorities of the individual torque requests changes, then the sequence of the modules changes which are to be processed according to the flowchart of FIG. 2. Furthermore, fewer or more torque requests can be processed in the manner described. The flowchart of FIG. 2 is then shortened by the modules, which are not to be processed, or is supplemented by additional modules to be taken up and processed. The sequence of the processing of the modules is always coupled to the sequence of the priorities of the individual torque requests, which are received in the engine control 10, in this example, starting with the lowest priority with increasing sequence of priority. If the nature of a torque request changes, then, in the sequence plan or flowchart, the corresponding module, which is to be processed, is exchanged, for example, when a torque request limiting downwardly is to be changed into a torque request limiting upwardly. If, in contrast, the sign changes in a torque request with additive contribution, then the same module C can be used with the condition that the sign is also transferred as a parameter. In this way, the method of the invention can be built up modularly in a simple manner. Here, attention must be paid to the situation that the individual torque requests are processed in the sequence of their priorities in order to form the desired torque to be realized via the at least one output quantity of the drive unit.

FIG. 3 shows how the desired torque is adapted sequentially via the individual torque requests in accordance with the sequence plan of FIG. 2 with this description being based on a time diagram plotted over the time axis (t).

Here, it should be assumed that the uncoordinated desired torque, which is present at the start of the program, lies above the lower limit of the first torque request whose priority is the lowest priority stage with the value 1. The uncoordinated desired torque lies above the lower limit of the first torque request. For this reason, the uncoordinated desired torque remains unchanged after execution of the module A. The second torque request has a priority rating which is at the value 2 and lies higher than the priority rating of the first torque request. The second torque request, as described, is a torque request which is limiting upwardly. In this case, according to FIG. 3, the present desired torque lies above the upper limit of the second torque request. For this reason, the desired torque is limited to the upper limit of the second torque request in the execution of module B according to the flowchart of FIG. 2. Thereafter, the third torque request is executed whose priority rating at the value 3 lies higher than the priority rating of the second torque request. In the third torque request and according to program point 120, the present desired torque (limited according to the second torque request) is increased by an additive contribution. Thereafter, the fourth torque request having a priority rating with the value 4 is executed which is higher than the priority rating of the third torque request. The fourth torque request is again executed with the module A because this module, in turn, is a torque request, which is limiting downwardly, but has a higher lower limit than in the first torque request. According to FIG. 3, the desired torque, which is present after the execution of program point 120, lies below the lower limit of the fourth torque request. For this reason, at program point 135, the desired torque is raised to the lower limit of the fourth torque request and is inputted as the resulting desired torque for adjustment via the at least one output quantity of the drive unit.

In the method of the invention described, the torque request which is just then to be realized is always applied to the desired torque, which is formed from the directly preceding torque request having the next lower priority. The torque request with the lowest priority is applied to the uncoordinated desired torque which, as described in this example, can be initialized via the driver command torque.

In FIG. 3, the desired torque resulting in each case is shown by a horizontal arrow. The method of the invention can be utilized not only in internal combustion engines having gasoline direct injection but generally in spark-ignition engines, diesel engines, in automobiles and in commercial vehicles. Depending upon the engine used, the output quantities of the drive unit, which are required to realize the desired torque, can change as known per se. The method of the invention is furthermore applicable to any desired drive concept wherein a desired value is formed from desired value input quantities and is intended to be realized with the aid of at least one output quantity of the drive unit. The drive unit can, for example, also be an electric drive and any desired alternative drive concept.

It is understood that the foregoing description is that of the preferred embodiments of the invention and that various changes and modifications may be made thereto without departing from the spirit and scope of the invention as defined in the appended claims.

What is claimed is:

1. A method for controlling a drive unit of a vehicle, the method comprising the steps of:
   receiving request quantities for an output quantity of said drive unit;
   assigning a priority to each of said request quantities;
   coordinating said request quantities in a time sequence in dependence upon their respective priorities to form a resulting request quantity as a desired value for said output quantity; and,
   adjusting said desired value for said output quantity.

2. The method of claim 1, wherein, when forming said desired value, the method comprises the further step of starting with the request quantity having the lowest priority.

3. The method of claim 1, comprising the further step of coupling said request quantities to different priorities, respectively.

4. The method of claim 1, wherein said request quantities limit said desired value or shift said desired value by an additive amount.

5. The method of claim 1, wherein a priority is permanently assigned to each one of said request quantities.

6. The method of claim 1, wherein a priority is variably assigned to each one of said request quantities.

7. The method of claim 6, wherein said priorities are assigned in dependence upon the operating state of said vehicle.

8. The method of claim 1, wherein different types of request quantities are considered by different modules; and, the same types of request quantities are each considered by a single module for forming said desired value.

9. The method of claim 1, wherein a desired torque is selected as said desired value.

10. The method of claim 1, wherein said request quantities are torque requests and wherein said desired value is a desired torque.

11. A method for controlling a drive unit of a vehicle, the method comprising the steps of:
adjusting an output quantity of said drive unit in dependence upon request quantities;
assigning a priority to each of said request quantities; and, to make the adjustment of said output quantity, forming a desired quantity which considers said request quantities in a sequence of their priorities.

12. The method of claim 11, wherein, when forming said desired value, the method comprises the further step of starting with the request quantity having the lowest priority.

13. The method of claim 11, comprising the further step of coupling said request quantities to different priorities, respectively.

14. The method of claim 11, wherein said request quantities limit said desired quantity or shift said desired quantity by an additive amount.

15. The method of claim 11, wherein a priority is permanently assigned to each one of said request quantities.

16. The method of claim 11, wherein a priority is variably assigned to each one of said request quantities.

17. The method of claim 16, wherein said priorities are assigned in dependence upon the operating state of said vehicle.

18. The method of claim 11, wherein different types of request quantities are considered by different modules; and, the same types of request quantities are each considered by a single module for forming said desired quantity.

19. The method of claim 11, wherein a desired torque is selected as said desired value.

20. The method of claim 11, wherein said request quantities are torque requests and wherein said desired value is a desired torque.

* * * * *